United States Patent [19]
Seymour

[11] Patent Number: 6,155,317
[45] Date of Patent: Dec. 5, 2000

[54] MECHANICAL PULL-THROUGH DELIMBING DEVICE

[76] Inventor: Kerry Richard Seymour, 1009 Country Club Rd., Perry, Ga. 31069

[21] Appl. No.: 09/458,859

[22] Filed: Dec. 10, 1999

[51] Int. Cl.[7] .................................. A01G 23/095
[52] U.S. Cl. .................... 144/24.13; 144/208.1; 144/343
[58] Field of Search .................. 144/4.1, 24.13, 144/208.1, 208.8, 335, 338, 340, 343

[56] References Cited

U.S. PATENT DOCUMENTS

| | | | |
|---|---|---|---|
| 3,029,848 | 4/1962 | Bombardier | 144/4.1 |
| 3,269,436 | 8/1966 | Moore | 144/4.1 |
| 3,635,266 | 1/1972 | Eriksson | 144/24.13 |
| 3,948,299 | 4/1976 | Laforge et al. | 144/24.13 |
| 4,111,245 | 9/1978 | McCrary et al. | 144/24.13 |
| 4,130,151 | 12/1978 | Ericsson | 144/338 |
| 4,350,189 | 9/1982 | Durchesne | 144/24.13 |
| 4,382,457 | 5/1983 | Hahn | 144/24.13 |
| 4,574,855 | 3/1986 | Jörgensen et al. | 144/24.13 |
| 4,766,939 | 8/1988 | Forslund | 144/24.13 |
| 4,899,794 | 2/1990 | Hamby, Jr. | 144/24.13 |
| 4,981,163 | 1/1991 | Westlund | 144/4.1 |
| 5,174,350 | 12/1992 | Johansson et al. | 144/4.1 |
| 5,406,997 | 4/1995 | Davison | 114/24.13 |
| 5,515,895 | 5/1996 | Hamby, Jr. | 144/24.13 |
| 5,533,555 | 7/1996 | Hudson | 144/24.13 |
| 5,628,354 | 5/1997 | Kingston | 144/338 |
| 5,704,407 | 1/1998 | Hamby, Jr. | 144/24.13 |
| 5,887,635 | 3/1999 | Hamby, Jr. | 144/343 |

*Primary Examiner*—W. Donald Bray
*Attorney, Agent, or Firm*—John S. Pratt; Kyle M. Globerman; Kilpatrick Stockton LLP

[57] ABSTRACT

A mechanical pull-through delimber device having opposed semicircular blades urged closed by counter-weights and coupled so that both open when one is pivoted open using a lever.

12 Claims, 4 Drawing Sheets

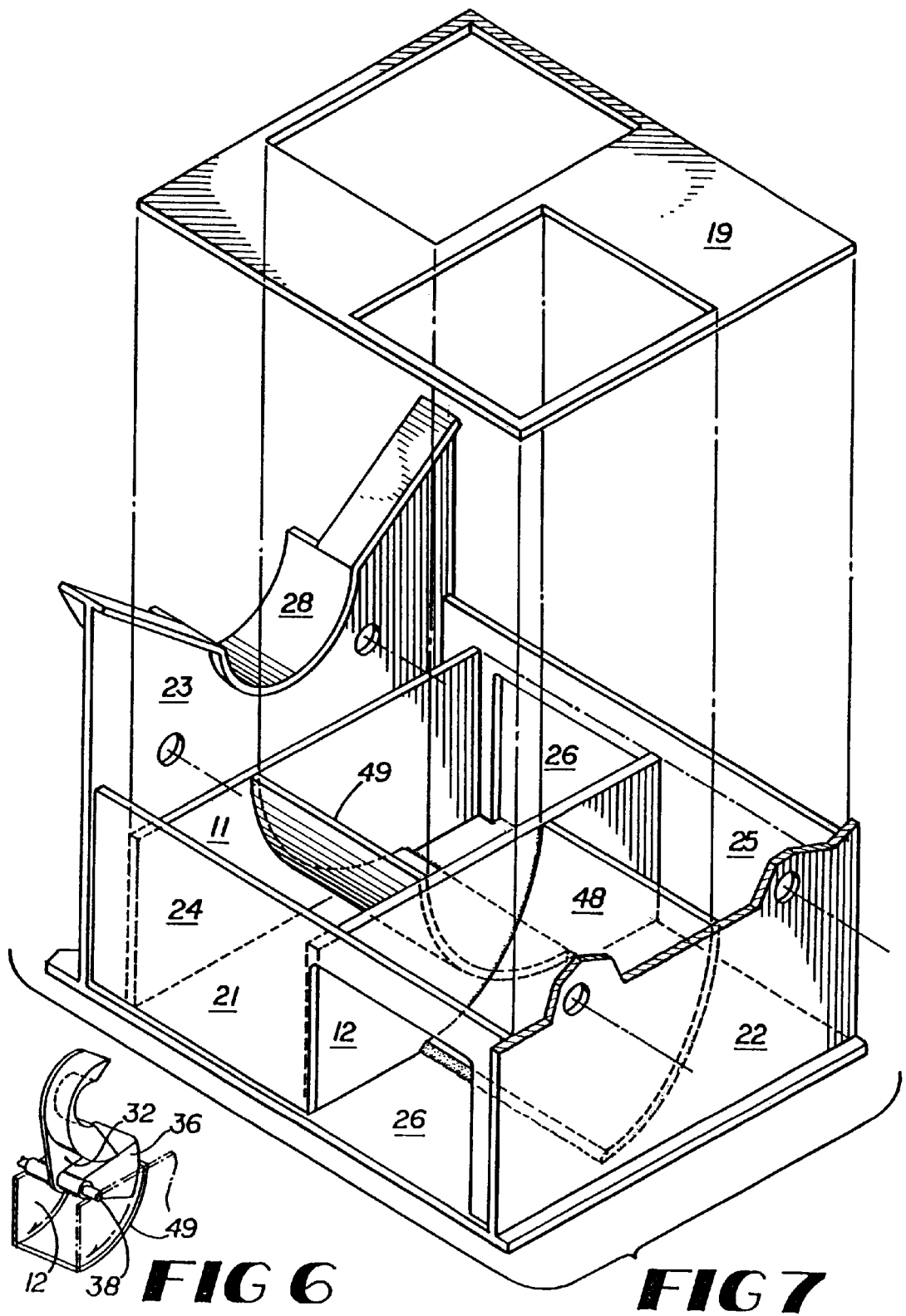

MECHANICAL PULL-THROUGH DELIMBING DEVICE

FIELD OF THE INVENTION

This invention relates to logging equipment and, more specifically, to devices used to strip branches off harvested or felled trees.

BACKGROUND OF THE INVENTION

Historically, delimbing felled or harvested trees was performed manually using axes, hand saws and powered chain saws. This method of delimbing works well on large trees with sporadic branches because the weight of a felled tree trunk will snap many of the branches off the trunk leaving a minimal amount of delimbing to be performed. When smaller trees with many branches are felled, the trunk weight is often insufficient to cause the branches to snap off. Consequently, the hand delimbing process was dangerous and unpredictable, as well as time consuming.

As a result, delimbers have been developed which strip the branches off a whole tree at the harvesting site, thereby eliminating the need for manual delimbing and drastically reducing the time necessary for delimbing. The need for a delimbing machine has grown over the years as modern forestry practice has relied on clear cutting and forest thinning through the removal of smaller trees.

A popular type of delimber is the pull through delimber. The majority of pull through delimbers allow for a tree to be placed in the delimbing device with delimbing blades surrounding and parallel to the tree trunk. The tree is then pulled through the device with the blades cutting the branches as it traverses the assembly. The majority of these types of machines contain hydraulics or electronics causing them to be very expensive to purchase and operate. As a result of the high purchase and operating costs, many logging operations cannot afford to purchase such delimbers. Another disadvantage of these types of delimbers is that they only delimb one tree at a time. Additionally, most of these delimbing assemblies are very complicated with many moveable parts that are susceptible to damage and breakdown.

Another type of delimbing device is the mechanical pull through type. U.S. Pat. No. 5,406,997, to Davison, describes a mechanical pull through delimbing device that does not use any electronic or hydraulic components. Instead, the Davison device uses the weight of a tree to actuate the delimbing blades. In Davison, a tree is placed onto the assembly so that the weight of the tree rests on a lever causing a set of delimbing blades to close about the trunk. The trunk is then pulled through the delimbing assembly causing the branches to be stripped off the trunk. The Davison device eliminates the use of hydraulics and electronics; however, the assembly uses many moving parts that are susceptible to breakdown and jamming. Furthermore, the Davison delimber only allows for one tree to be placed into the assembly at a time resulting in a slow and tedious process in delimbing trees in a logging operation. An additional drawback associated with the Davison device is that it relies on the weight of the tree to close the blades. This method of operation is troublesome for small trees whose weight is insufficient to properly close the blades around the trunk. Davison also uses a spring to exert an opposite force on the support lever that is susceptible to stretching and breaking.

SUMMARY OF THE INVENTION

This invention is a mechanical pull through delimbing assembly for delimbing felled trees. The assembly is mounted on a base allowing it to rotate and pivot during operation. Multiple trees may be processed simultaneously. The blade assembly includes two delimbing arms, each carrying a semi-circular blade, that pivot on parallel shafts between: (1) an open position with the arms and blades separated from the path along which tree trunks are drawn in order to sheer off the limbs and (2) a closed position with the blades positioned near either side of that path. Each arm carries a counter-weight that urges it toward the closed position, and the two shafts on which the arms pivot are coupled by a chain that passes around sprockets mounted on the shafts so that the shafts will counter-rotate. Thus, opening one arm, by manipulating a lever attached to that arm, causes the other arm also to open. The two arms can close separately because differential closure merely causes slack in the chain. A fixed, upward-facing semi-circular blade on the front end of the frame that support the counter-rotating shafts cradle tree trunks when they are placed in the machine with its arms open and also sheer limbs from the trunks when they are drawn through the machine. In addition, the counter weights articulate in close proximity to arcuate plates sweeping debris out the side access panel minimizing the potential for jamming. The sweeping action of the counter-weights takes place in two sweeper boxes formed by a top plate containing apertures for the counter-weights to articulate through. The arcuate plates are connected to the top plate and base plate to form the bottom of each sweeper box.

It is a primary object of this invention to provide the logging industry with a pull through delimbing device that is more durable, easier to use, less susceptible to jamming and less expensive to operate. It is a further object of this invention to provide a pull through delimbing device that can delimb multiple trees at one time. An additional object of this invention is to provide a pull through delimbing device that operates without the aide of any hydraulic or electronic control. A further object of this invention is to provide a pull through delimbing assembly that is affordable throughout the logging industry. Another object of this invention is to provide a delimbing device that operates using the force of gravity. Still further objects and advantages will become apparent from a consideration of the ensuing description and drawings.

BRIEF DESCRIPTION OF THE DRAWINGS

FIG. 6 is a fragmentary perspective detail view of the sweeper box and counterweight portion of the delimbing assembly of this invention.

FIG. 7 is a fragmentary perspective view of the frame assembly of the delimbing assembly of FIG. 1.

DETAILED DESCRIPTION OF THE DRAWINGS

Figure 1:
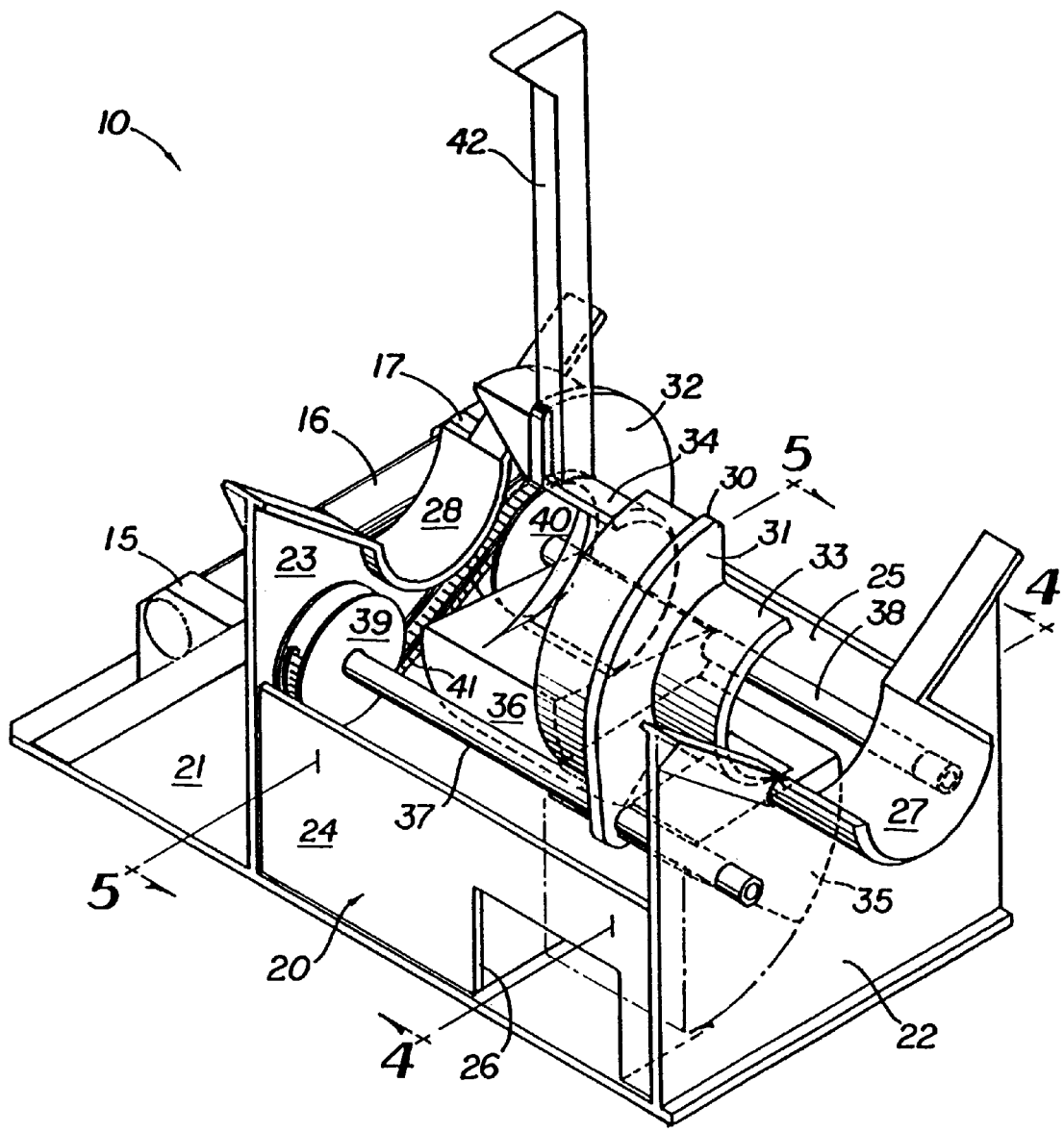
FIG. 1 is a perspective view of the delimbing assembly of this invention in its closed position.
Figure 2:
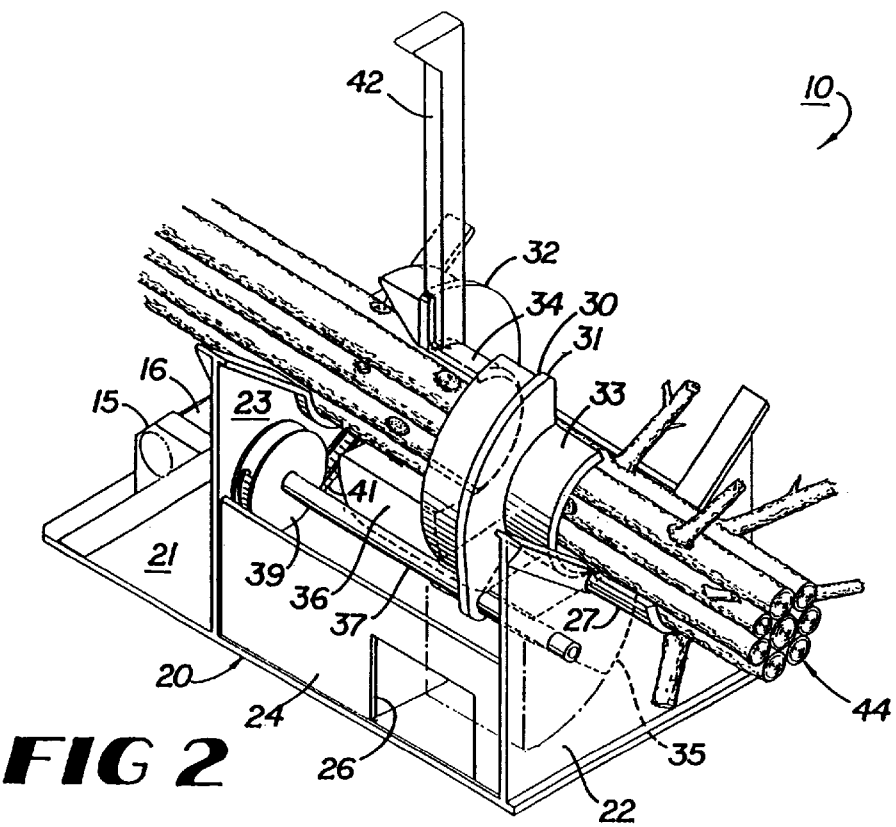
FIG. 2 is a perspective view of the delimbing assembly of FIG. 1 holding multiple trees in the blade assembly.
Figure 3:
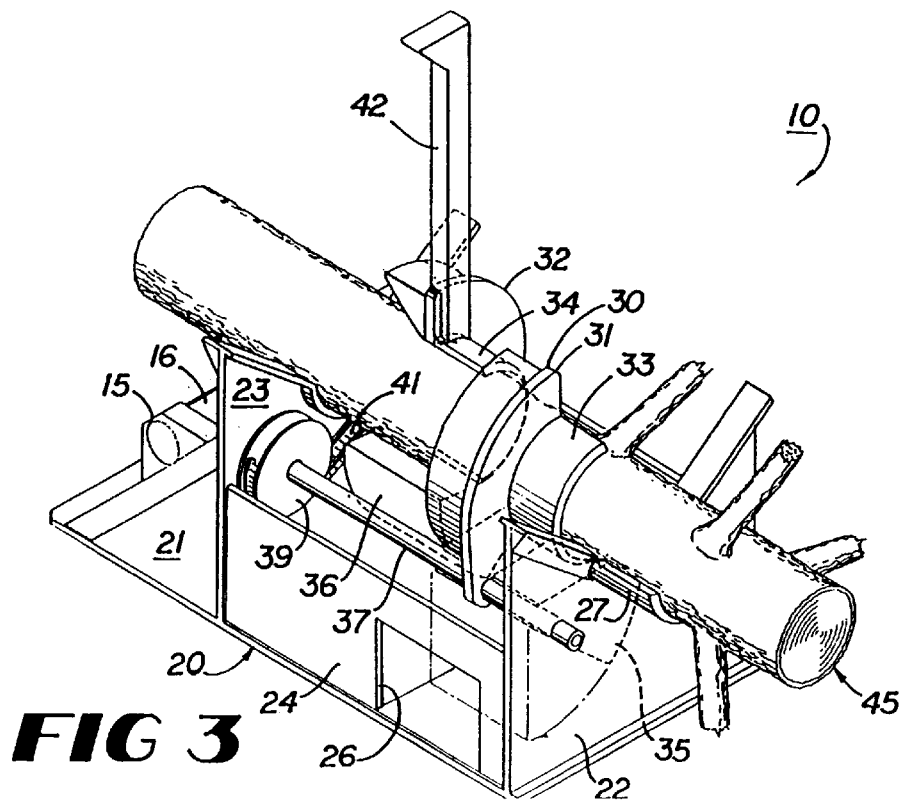
FIG. 3 is a perspective view of the delimbing assembly of FIG. 1 holding a single large tree in the blade assembly.

FIGS. 1–3 show an overall view of a mechanical pull-through delimber assembly 10. The delimber 10 operates on a plurality of trees 44 or on a single tree 45, FIGS. 2 and 3 respectively, by pulling the tree or trees through the delimber assembly 10 with the use of a grapple loader or other lifting device. The delimber assembly 10 is attached to a base (not shown) allowing for the assembly 10 to rotate around an axis perpendicular to the base and to pitch in all directions.

Figure 4:
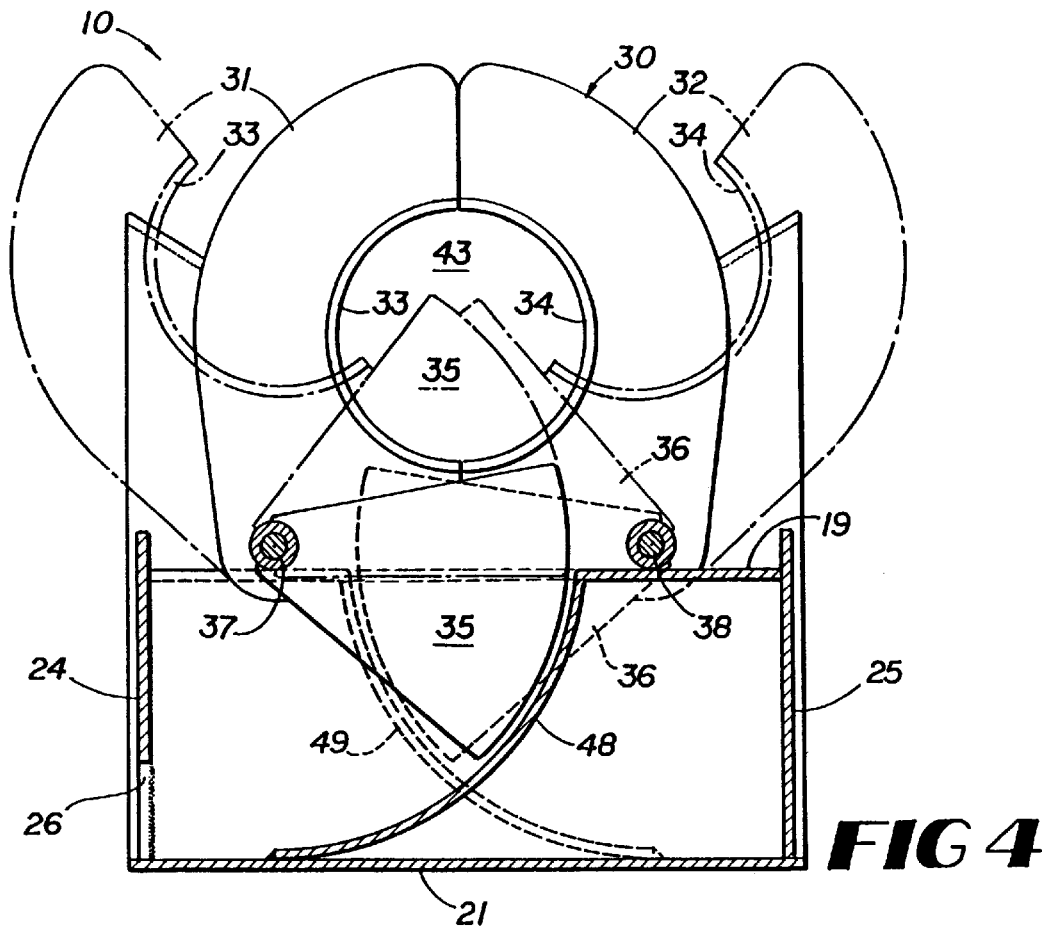
FIG. 4 is a cross-section taken along line 4—4 in FIG. 1.

The delimbing assembly framework 20 is made from a base, top, front, rear, left and right steel plates 21, 19, 22, 23, 24 and 25 respectively. The plates are welded or otherwise rigidly attached. Top plate 19 contains two openings which allow counter-weights 35 and 36 to rotate through top plate 19. In addition, two vertical plates 11 and 12 are welded, or otherwise rigidly attached to the left, right and bottom plates 24, 25 and 21 respectively, forming the side walls of each sweeper box. Moreover, there are two arcuate inner steel plates 48 and 49 that are welded, or otherwise attached to the top plate 19, bottom plate 21, and vertical plates 11 and 12 to form the floor of the sweeper boxes as shown in FIGS. 4, 6 and 7. The right and left side panels 24 and 25 are equipped with debris access openings 26. The debris access openings 26 allow counter-weights 35 and 36 to sweep debris from the sweeper boxes, as shown in FIG. 7. In an another embodiment, a second vertical plate, installed in parallel and in close proximity to plate 12, can be used to provide support for top plate 19 while forming the inner walls of the sweeper boxes.

Figure 5:
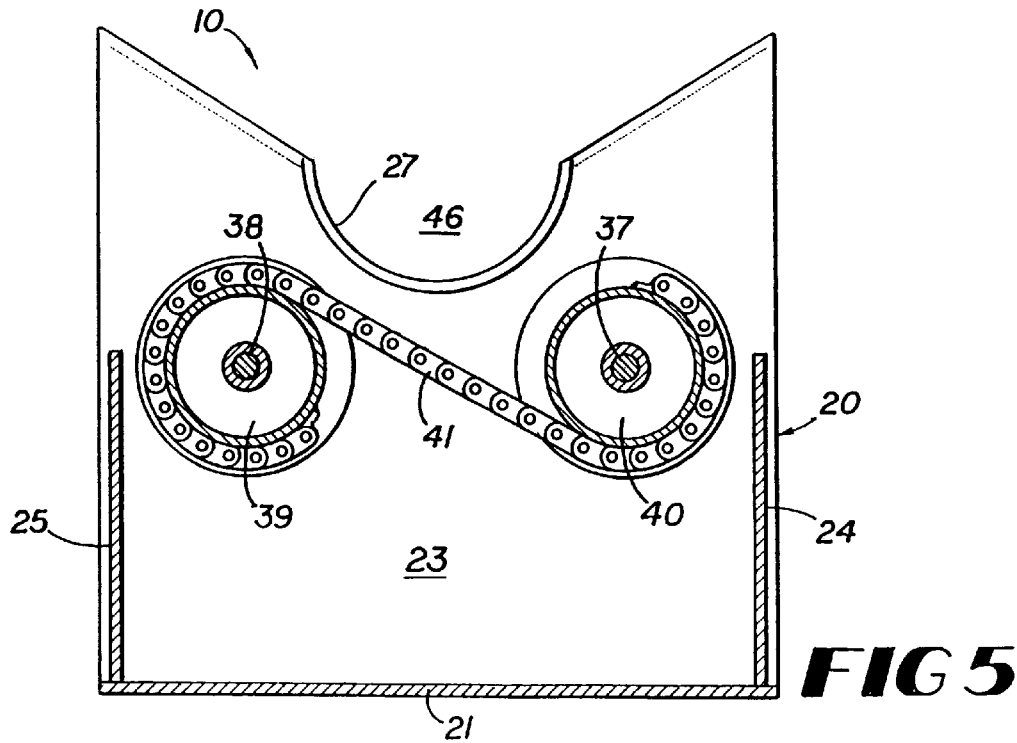
FIG. 5 is a cross-section taken along lines 5—5 in FIG. 1.

As shown in FIG. 1, the framework 20 contains two stabilizing bars 15 and 17 that are connected from the base plate 21 to the rear plate 23 to provide support and structural stability. The stabilizer bars 15 and 17 are connected by a cross bar 16. FIG. 5 shows concave openings 46 in front and rear plates 22 and 23 to accommodate front 27 and rear 28 trunk guides. Trunk guide 27, shown in FIG. 1, serves as a fixed delimbing blade removing branches from the trunk as it is pulled through the delimber assembly 10.

The blade assembly 30 includes delimbing arms 31 and 32, delimbing blades 33 and 34, counter-weights 35 and 36, steel shafts 37 and 38, sprockets 39 and 40, a chain 41, and an arm opener lever 42. Each steel shaft 37 and 38 is mounted between the front and rear plates, 22 and 23 respectively, parallel to each other.

The delimbing arms 31 and 32 are separately coupled to the steel shafts 37 and 38 respectively, allowing for each arm to pivot about the axis of the shafts 37 and 38. The delimbing blades 33 and 34 are mounted on the delimbing arms 31 and 32, respectively, such that the blades 33 and 34 face the front plate 22. The delimbing blades 33 and 34 are semi-circular. The semi-circular shape allows blades 33 and 34 to fit snugly around the circular shaped trunk or group of trunks. The delimbing arms 31 and 32 are also coupled to counter-weights 35 and 36 respectively. The weights 35 and 36 are coupled to the delimbing arms 31 and 32 in such a manner as to force the arms 31 and 32 to pivot about the steel shafts 37 and 38 to a closed position. In addition, as counter-weights 35 and 36 pivot on the steel shafts 37 and 38, they sweep through the stationary sweeper boxes, pushing debris through debris access openings 26 as arms 31 and 32 fall to their closed position, as shown in FIGS. 4 and 6.

The steel shafts 37 and 38 are coupled together so that the shafts 37 and 38 will counter-rotate when the lever 42 is pushed in a clockwise direction as viewed in FIGS. 1–3. Lever 42 is pushed to an open position by the grappled log or logs and they are placed in the delimber thereafter the counter-weights 35 and 36 exert a force against the log via the arms 31 and 32. In the preferred embodiment, the shafts 37 and 38 are coupled together using sprockets 39 and 40 and a chain 41 such that the shafts 37 and 38 rotate counter to each other. Alternatives to chain 41 can be used such as a belt, cable or the equivalent. Other means of coupling shafts 37 and 38 can be used such as gears. The sprockets 39 and 40 also can be replaced for example, by a pulley or other functionally equivalent structure. A cover (not shown) may be installed over sprockets 39, 40 and chain 41 to protect them from falling debris. FIG. 5 shows the chain 41 in its proper configuration for interconnecting the two sprockets 39 and 40. The configuration allows for the delimber arm 31 to open in the counterclockwise direction independently of the second delimber arm 32 which opens in the clockwise direction. The delimbing arms 31 and 32 are opened by a release mechanism, such as, for example, an arm opener lever 42. The lever 42 is coupled to a delimbing arm 32 and protrudes upward almost vertically when the arms 31 and 32 are closed. Other means can be used to open the delimbing blade assembly 30, such as a cable, crank or other mechanism.

Operation of the delimber 10 begins when a grapple loader, or some other lifting device, picks up a tree and pushes open the delimber blade assembly 30 by exerting pressure against the lever 42. The outward pressure against the lever 42 causes the delimbing arm 32 to rotate clockwise. This motion causes the sprocket 40 to rotate clockwise causing the chain 41 to exert a force on sprocket 39 rotating it counter-clockwise. The counter-clockwise rotation causes the delimbing arm 31 to rotate counter-clockwise opening up the delimber blade assembly as shown in FIG. 4. The operator then places the tree in the delimber as shown in FIGS. 2 and 3. Once the tree is placed in the delimber 10, the counter-weights close arms 31 and 32 around the tree. The operator then pulls the tree through the delimber assembly 10 causing the delimbing blades 33 and 34 and the trunk guide 27 to cut the limbs from the trunk. The delimber 10 also can operate on a group of trees as shown in FIG. 2.

The foregoing is provided for purposes of illustrating, explaining, and describing embodiments of the present invention that provide a device for delimbing trees in a safe and economical manner. Modifications and adaptations to these embodiments will be apparent to those skilled in the art and may be made without departing from the scope or spirit of the invention or the following claims.

What is claimed is:

1. A tree delimbing device, comprising:
   a first blade rotatable about a pivot; and
   a first counter-weight coupled to the blade for causing the blade to rotate about the pivot.

2. The delimber of claim 1, further comprising a second blade.

3. The delimber of claim 2, wherein the first blade is coupled to the second blade so that opening the first blade causes the second blade to open.

4. The delimber of claim 3, wherein the coupling comprises two sprockets and a chain.

5. The delimber of claim 4, wherein the delimbing blades are semicircular.

6. The delimber of claim 5, further comprising a second counter-weight coupled to the second blade.

7. A tree delimbing device, comprising:
   first and second delimbing blades, each of which is rotatable about a pivot;
   a counter-weight coupled to the first blade for causing the blades to rotate about the pivots; and coupling between the blades so that opening the first blade causes the second blade to open.

8. The delimber of claim 7, wherein the coupling comprises two sprockets and a chain.

9. The delimber of claim 8, wherein the delimbing blades are semicircular.

10. The delimber of claim 7, further comprising a second counter-weight coupled to the second blade.

11. The delimber of claim 7, wherein the counter-weight sweeps through an arc when it causes the blades to rotate, and further comprising an arcuate plate for catching debris that is swept off the plate by movement of the counter-weight.

12. The delimber of claim 11, further comprising a second counter-weight wherein the counter-weights sweep through an arc when they cause the blades to rotate, and further comprising a first and second arcuate plate for catching debris that is swept off the plates by movement of the counter-weights.

* * * * *